Dec. 19, 1939.  B. S. BURRELL  2,184,177

STRAINER APPARATUS

Filed Oct. 19, 1935  5 Sheets-Sheet 2

Inventor:
Benjamin S. Burrell.
By Dyrenforth, Lee, Chritton and Wiles
Attys.

Dec. 19, 1939.  B. S. BURRELL  2,184,177
STRAINER APPARATUS
Filed Oct. 19, 1935  5 Sheets-Sheet 3

Inventor:
Benjamin S. Burrell.
By Dyrenforth, Lee, Chritton & Wiles.
Attys.

Dec. 19, 1939.  B. S. BURRELL  2,184,177
STRAINER APPARATUS
Filed Oct. 19, 1935  5 Sheets-Sheet 4

Inventor:
Benjamin S. Burrell.
By Dyrenforth, Lee, Chritton & Wiles.
Attys.

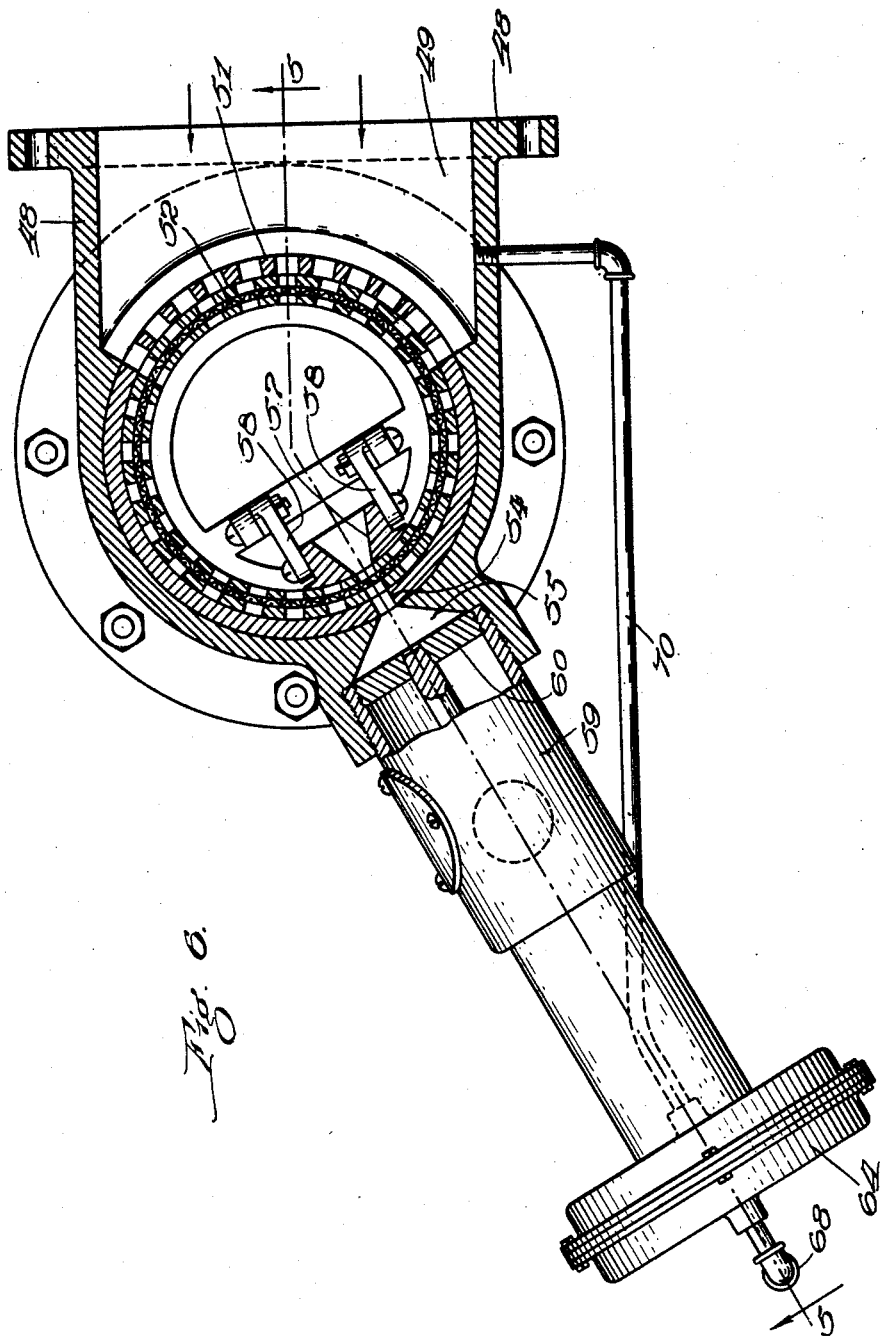

Patented Dec. 19, 1939

2,184,177

UNITED STATES PATENT OFFICE 2,184,177

STRAINER APPARATUS

Benjamin S. Burrell, East Chicago, Ind.

Application October 19, 1935, Serial No. 45,812

12 Claims. (Cl. 210—152)

My invention relates, as to one phase thereof, to automatically operating filtering or strainer apparatuses for use as for example in cleaning water, sewage disposal, oil separation, oil filtering, food product separation, gas cleaning, cement plant cleaning, and air cleaning, to remove, by way of example, particles of dirt or other solid foreign matter from liquids and gases, or separating constituents of different viscosities as for example in the case of oil separation; and as to another phase thereof to filtering or strainer apparatuses in which the strainer element is in the form of a flat disk; the present application being in part a continuation of my application for United States Letters Patent Serial No. 550,237, filed July 11, 1931.

My objects, generally stated, are to provide improvements in filtering or strainer apparatuses of the back-washing type to the end that the fluid used for back-washing may be conserved to the maximum extent; to provide improvements in strainer apparatus of the flat disk type to the end that such apparatus will be better adapted to perform the service for which it is provided; be reliable in operation and not be liable to impairment. Certain of my more specific objects are to provide for the cleaning of the strainer element, by gaseous pressure when, and if, desired, and to provide means whereby the supplying of the cleaning fluid, gaseous or liquid, will be automatically controlled and supplied only as needed, to effect the cleansing operation, and preferably only in such amounts, as are required to effect the desired degree of cleansing; and other objects as will be manifest from the following description.

Referring to the accompanying drawings:

Figure 6, a section taken at the line 6 on Fig. 5 and viewed in the direction of the arrow.

Figure 1:
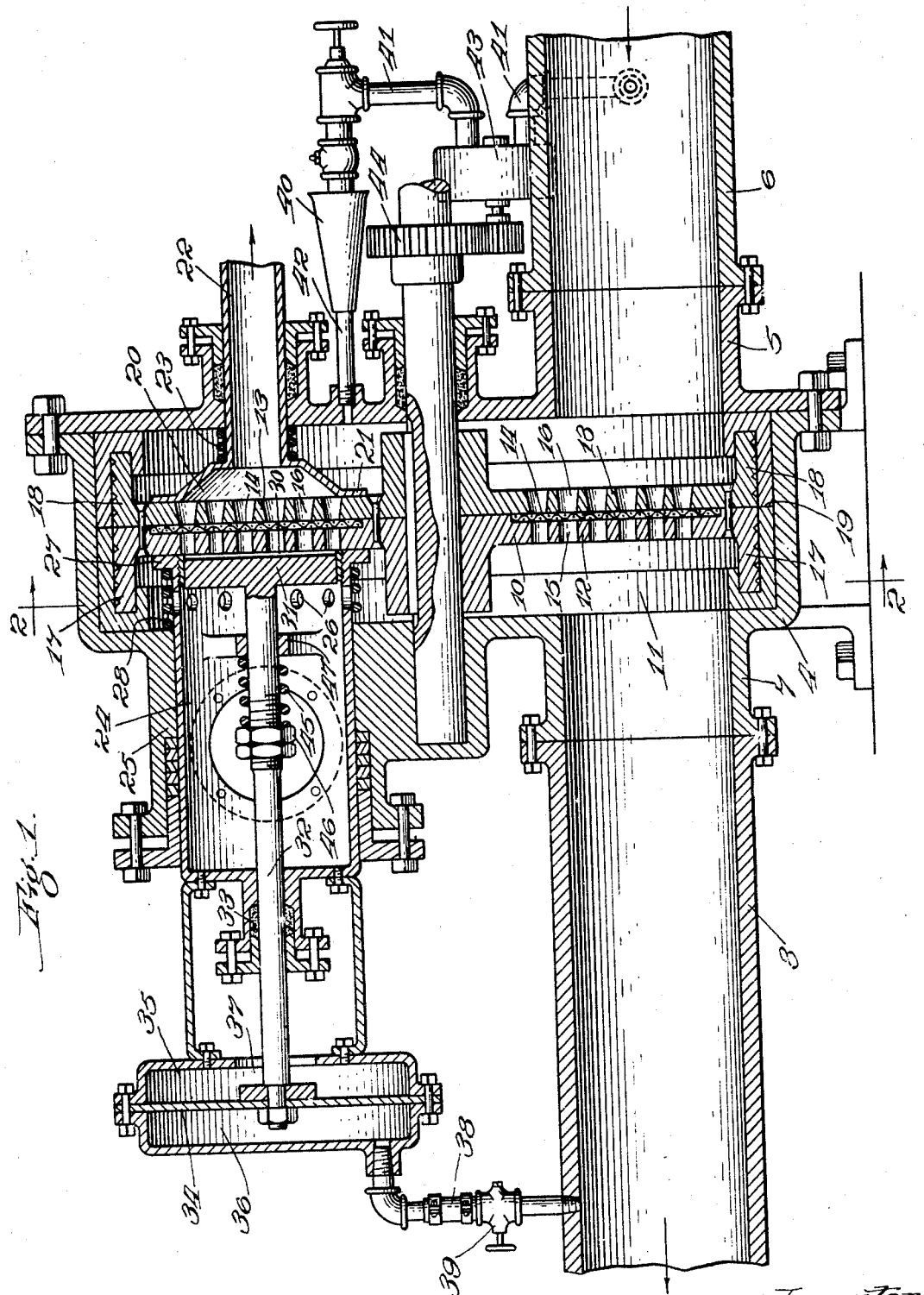
Figure 1 is a view in longitudinal sectional elevation of a pipe line through which the fluid to be operated on, as for example water to be cleansed, is conducted, together with a strainer apparatus constituting one embodiment of my invention, associated therewith.

Referring to the embodiment of my invention illustrated in Figs. 1, 2 and 3, 4 represents a casing having an inlet 5 at its lower portion connected with a pipe 6 through which the fluid to be operated on as for example water to be cleansed, is conducted to the casing 4, the casing 4 having an outlet 7 also at its lower portion which connects with a pipe 8 through which the fluid after being subjected to the strainer action hereinafter described, as for example to remove foreign particles from the water, is conducted away to storage or to the desired point of use.

Journaled in the casing 4 is a shaft 9 driven in any suitable manner and having fixed thereto a strainer disk 10 located in the chamber 11 of the casing 4 and forming a foraminous partition. The disk 10 is shown as formed of a pair of flatwise opposed disk members 12 and 13 between which a ring 14 of strainer material, as for example wire mesh, is interposed, the disk members 12 and 13 containing registering perforations 15 and 16, respectively, the perforations 16 preferably flaring outwardly as shown.

The disk members 12 and 13 are provided with outwardly flaring annular flanges 17 and 18, respectively, which form a rim at which the members 12 and 13 are rotatable in a channeled annular liner member 19 extending about the inner periphery of the casing 4.

Located in the upper portion of the chamber 11 is a frusto conical hood 20 provided with an outwardly extending annular rim 21 opposing the face of the disk member 13, the hood 20 being provided on the end of a pipe 22 slidable in a side wall of the casing 4 and forming with this pipe an outlet through which the material deposited on the strainer ring 14 and in the pockets presented by the perforations 16, is forced as hereinafter described. A spring 23 surrounding the pipe 22 and interposed between a wall of the casing 4 and the hood 20 serves to maintain bearing contact between the hood and the disk member 13.

In alinement with the hood 20 at the opposite side of the disk 10 is a cylinder 24 forming a chamber and slidable in a boss 25 on the casing wall, the cylinder 24 containing a series of openings 26 in its side wall which open into the chamber 11 and through which fluid for cleaning the drum 10 passes into the cylinder 24.

The cylinder 24 bears at an annular flange 27 thereon against the face of the disk member 12 with which it makes a tight joint under the action of a coil spring 28 surrounding the cylinder 24 and interposed between the adjacent casing wall and the flange 27.

The end of the cylinder 24 at which it bears against the disk member 12 is provided with a disk 29 containing a central diametrical slot 30 forming a seat for a taper valve 31 mounted on the end of a rod 32 slidable in a stuffing box 33 mounted on the outer, closed, end of the cylinder 24, the outer end of the rod 32 being connected with a flexible diaphragm 34 mounted in a stationary diaphragm casing 35. The diaphragm 34 divides the casing 35 into two compartments 36 and 37, the outer compartment 36 being in communication with the pipe 8 through the medium of a pipe 38 provided with a manually operated valve represented at 39.

It may be here stated that in the continuing rotation of the disk 10, the fluid to be operated on passes from the pipe 6 through the strainer disk 10 and thence to the pipe 8, the screen 14 serving to intercept the material to be removed from the fluid, in the case of the cleansing of water, the solid particles in the water, the material removed from the fluid becoming lodged in the cavity, or pocket, forming perforations 16 carried therein in the continuous rotation of the disk 10 to a position in which they register with the slot 30 and the hood 20 at which point they are subjected to a countercurrent of cleansing fluid which forces the material from the screen 14 and out through the pockets 16 and into the hood 20 for discharge through the pipe 22.

Any suitable means for supplying cleansing fluid to the cylinder 24 for the purpose just stated may be provided. In the particular construction shown and provided for straining liquids, and in the use of which waste of the liquid is to be prevented, air pressure is used as the cleansing fluid, the air pressure being generated by an injector action produced by the pressure of the water in the pipe 6, the apparatus to this end being provided with an injector 40 into which a pipe 41, communicating with the pipe 6, opens thereby entraining air with the liquid in discharging into the injector, the liquid and entrained air discharging from the injector into the chamber 11 through a pipe 42, the air thus introduced into the chamber 11 discharging through the ports 26 into the cylinder 24 and thence, assuming the valve 31 to be open, through the disk 10 and thence into the hood 20 and its pipe extension. To insure the necessary speed of flow of liquid to the injector 40 for effecting the desired air pressure within the cylinder 24, a booster pump 43 is provided in the pipe 41, this pump being shown as driven by gearing 44 connecting the rotor of the pump 43 with the shaft 9. It will be understood, however, that where air pressure is to be used for cleansing the strainer disk the air, instead of being supplied by the injector action as described, may be supplied from any suitable source of compressed air supply opening either into the chamber 11 or directly into cylinder 24, in which case the openings 26 may be omitted.

The diaphragm mechanism associated with the valve 31 as above described and in communication with the pipe 8 is provided for the purpose of controlling the flow of cleansing fluid through the slot 30 in the end of the cylinder 24 to the end that the cleaning fluid will be directed against the strainer disk 10 only when needed to cleanse the latter and of an amount necessary to effect such action. The position of the valve 31 is controlled by the amount of pressure existing in the pipe 8, rise of pressure in the pipe 8 operating to move the valve 31 toward closed position and in opposition to a coil spring 45 surrounding the rod 32 and confined between nuts 46 adjustable along the rod and a spider 47 in the cylinder 24, and reduction of pressure in the pipe 8 permitting the valve 31 under the action of the spring 45, to move to open position. Thus, assuming the valve 31 to be in closed position, the building up of intercepted matter on the strainer material 14 results in the reduction of the pressure in the pipe 8 whereupon the valve 31 automatically opens permitting of the flow of cleansing fluid in the cylinder 24, through the slot 30 for performing the cleansing function, this valve remaining open, and the cleansing operation continuing, upon successive portions of the drum 10, until the restoration of such a degree of freedom of flow of fluid through the drum 10 as results in the rebuilding of back pressure within the pipe 8 sufficient to close the valve 31.

As will be noted, the degree to which the valve 31 opens, and consequently the volume of flow of back-washing liquid through the disk 10, depends on the degree of resistance presented by the accumulated solid matter on the disk to the flow therethrough of the fluid to be filtered, and thus only such amount of back-washing fluid is used as is requisite to effect the removal, to the desired extent, of the solid matter from the disk; it being desired in practice, at least under some conditions, that not all of the solid matter be removed by the backwashing fluid as the strainer element when thinly coated with the solid matter may better perform the straining function.

As will be understood from the foregoing where the cleansing fluid employed is gaseous and the fluid being operated on is a liquid, the discharge of the gaseous fluid into the chamber 11 as described operates to maintain a body of the compressed gaseous fluid between the cylinder 24 and the liquid in this chamber thereby exerting downward pressure on the liquid and preventing the latter from entering the cylinder, thus avoiding waste of the liquid. However, it may be that under certain conditions of operation the pressure of gaseous fluid in the top of the chamber 11 may not be sufficient to prevent the liquid at all times from rising into the cylinder 24 and discharging through the disk 10 and thence to the hood 20 thereby effecting a cleansing action in conjunction with the gaseous fluid. It is preferred, however, that in those cases where it is desired none of the liquid be wasted that only gaseous fluid be used for the cleansing action.

Where a limited loss of liquid by wastage is immaterial, the cleansing action of the strainer disk may be effected wholly by liquid flow therethrough either from the chamber 11 or piped to the cylinder 24 directly from the outside, the holes 26 in the latter case being omitted, but controlled as by the valve-control mechanism described, in which case the injector mechanism referred to would be omitted.

In the use of the apparatus for cleaning gaseous fluids the injector 40 together with the pipe line leading thereto from the pipe 6 is omitted and the cleansing of the strainer disk 10 is effected by a portion of the gas after passing through the disk 10, the control mechanism for the valve 31 and above described functioning as in the case of the use of the construction in operating upon liquid and thereby conserving the amount of gas escaping through the exhaust pipe 22.

Figure 2:
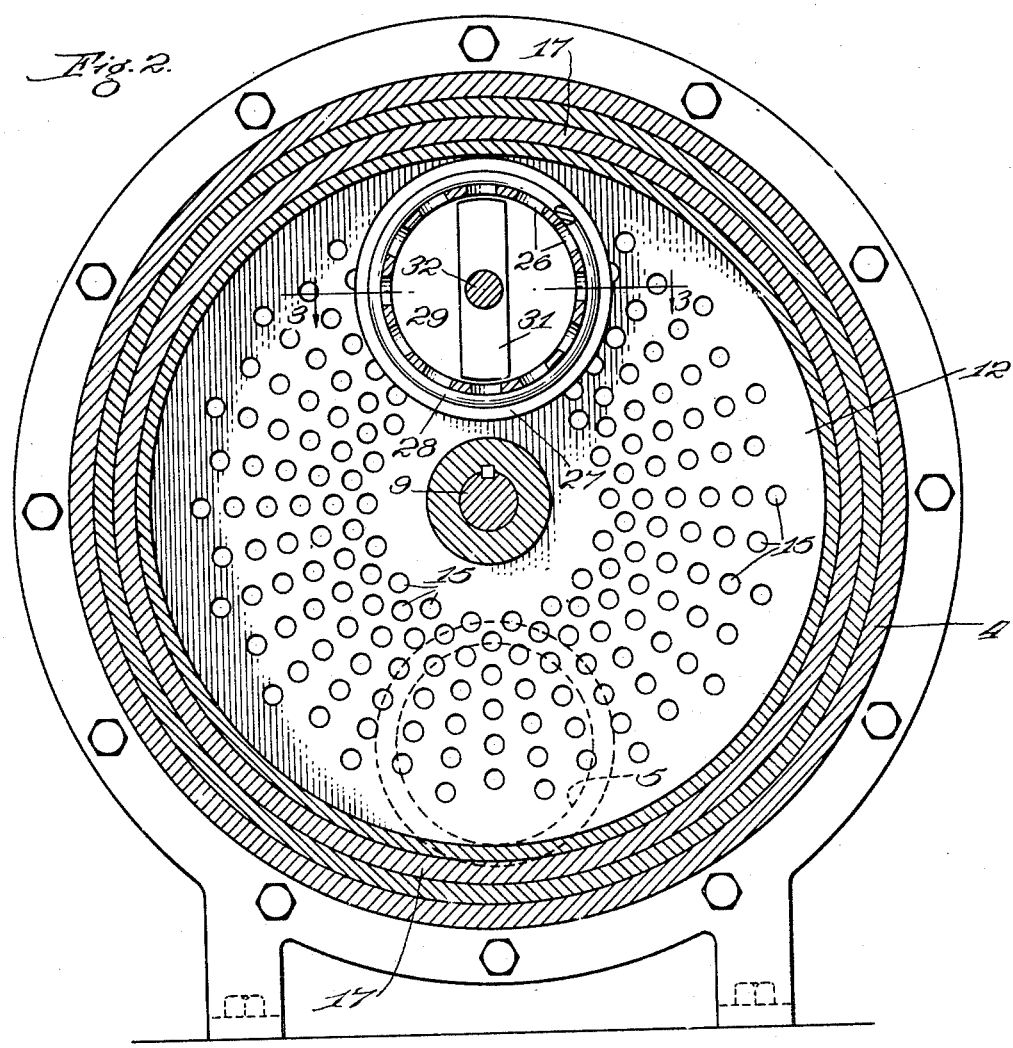
Figure 2 is a section taken at the line 2—2 on Fig. 1 and viewed in the direction of the arrows.
Figure 3:
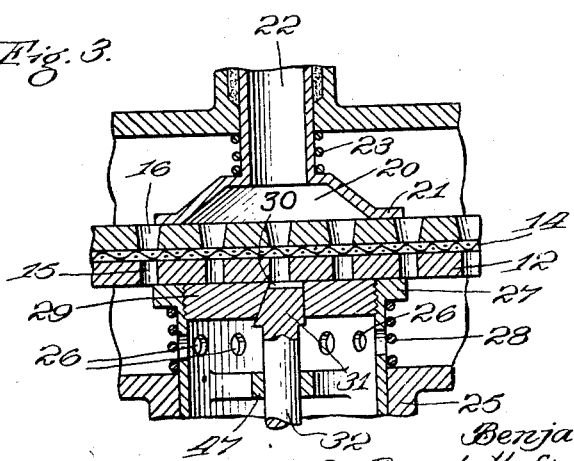
Figure 3 is a broken section taken at the line 3—3 on Fig. 2 and viewed in the direction of the arrows.

The construction just described presupposes the supplying of the fluid to be screened at a substantially uniform predetermined pressure. Where, however, the flow of fluid to be screened to the strainer apparatus is not at a uniform pressure, as occurs sometimes in practice, the back-washing-fluid-controlling means would preferably be so constructed that they would properly function regardless of variations in the pressure of the incoming fluid to be screened; and as illustrative of such modification reference is made to the construction shown in Fig. 4, a description of which is as follows:

This construction is the same as the one shown in Figs. 1, 2 and 3, except that the diaphragm casing 35 instead of being open at one side to the atmosphere is closed by a stuffing box 35ᵃ for the rod 32; the spring 45 of Figs. 1–3 is removed from its position between the nuts 46 and the spider 47 and placed between the nuts 46 and the end wall of the cylinder 24 (the spring thus repositioned being represented at 45ᵃ); and the compartment 35 connected by a pipe 35ᶜ with the pipe 6.

Such diaphragm mechanism is thus of the differential type whereby the valve 31 is operated responsive to a predetermined differential between the pressures in the pipes 6 and 8 produced by accumulation of solid matter on the screening disk 10, regardless of uniformity of pressure of the fluid in pipe 6, the degree of differential necessary to open the valve 31 being regulated by varying the tension of the spring 45ᵃ by adjusting the nuts 46ᵃ, the valve 31 opening to an extent proportional to the increments of differential between the pressures in pipes 6 and 8, whereby as the differential increases the valve 31 opens by an increased amount to permit an increase in the volume of flow of backwash fluid through the strainer disk 10, and as the differential decreases the valve moves proportionately toward closed position to throttle the flow of backwashing fluid.

In both of the constructions above described the valve 31 controlling the flow of backwashing fluid is at the inlet side of the backwashing course. It will be understood, however, that my invention also contemplates the location of the backwash-controlling valve at the outlet side of the backwashing course instead of at the inlet to this course.

Figure 5:
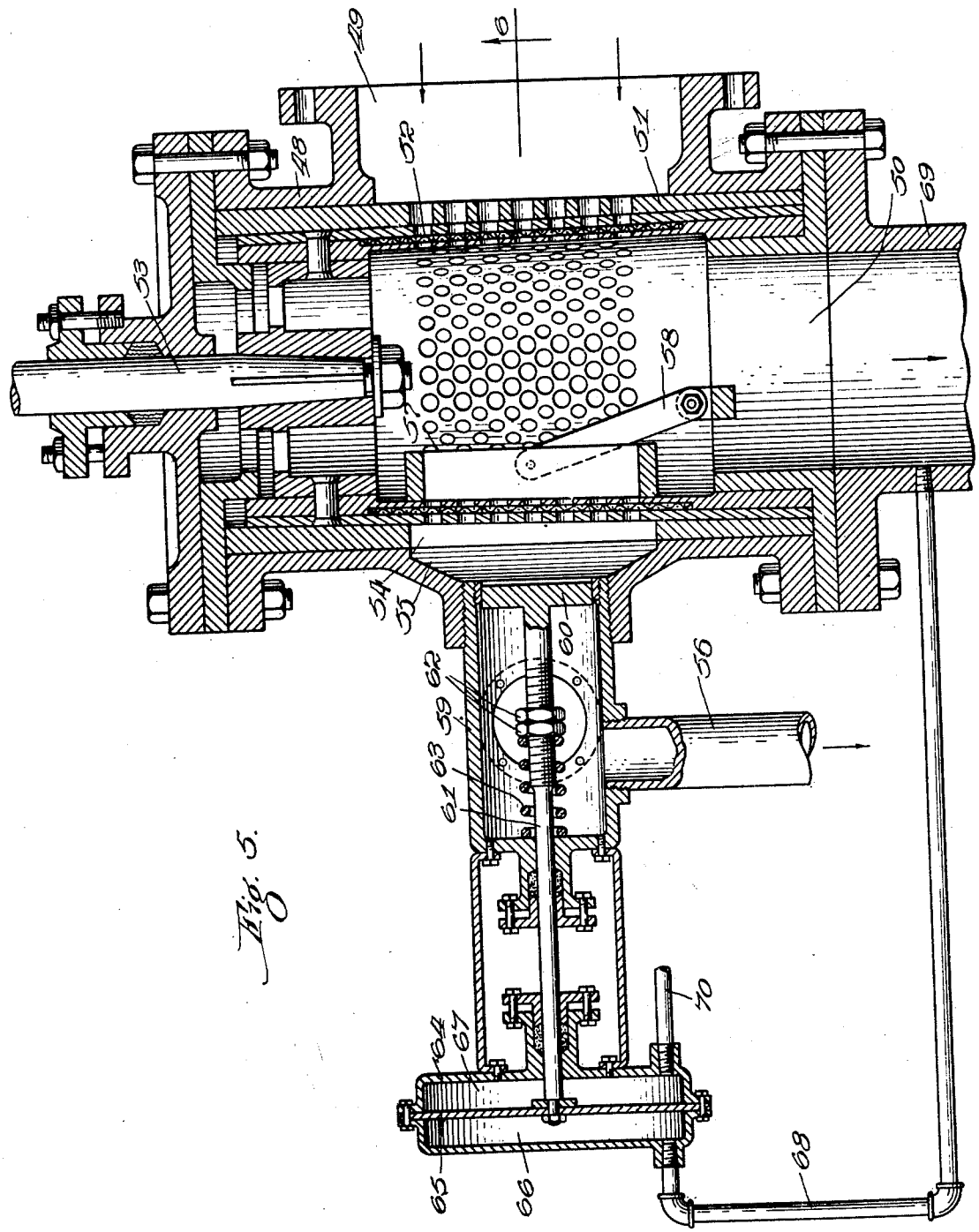
Figure 5 is a broken vertical sectional view taken through a strainer apparatus of another type and embodying my invention, the section being taken at the irregular line 5—5 on Fig. 6 and viewed in the direction of the arrows.

As a specific exemplification of locating the backwash-controlling valve at the outlet side of the backwashing course and as illustrative of the embodiment of the invention in strainer apparatus employing a strainer element of another type, reference is made to the construction shown in Figs. 5 and 6 a description of which is as follows:

The apparatus shown in these figures is of the same general construction as that disclosed in United States Letters Patent No. 1,968,741, granted to me on July 31, 1934, and therefore a general description of the features common to the construction shown in said patent and in Figs. 5 and 6 hereof will suffice.

The apparatus shown comprises a casing 48 closed at its upper end and having in its side wall an opening 49 to receive the fluid to be screened and its lower end being open as represented at 50 to provide an outlet for the screened fluid.

Journalled in a perforated sleeve 51 in the casing 48 is a strainer device 52 in the form of a reticulated shell of general cylindrical form and opening at its lower end into the outlet 50 in the casing 48.

The strainer device 52 is shown as connected at its upper end with a shaft 53 extending downwardly into casing 48 and rotatable, to rotate the strainer device 52, by any suitable means.

From the foregoing it will be understood that solid matter flowing with the fluid into the inlet 49 will become deposited on the outer circumference of the strainer device 52, the screened fluid passing into the interior of the device 52 and thence to discharge through the outlet 50.

Means are also provided for effecting backwash of the strainer device 52 to remove therefrom accumulations of solid matter deposited thereon in the screening operation as above stated, the means shown comprising registering ports 54 and 55 in the sleeve 51 and casing 48, respectively, and opening to discharge through a pipe 56, these means as shown further comprising a nozzle 57 which, however, may be omitted, located in the strainer device 52 and pivoted on links 58 to constantly bear against the inner surface of the device 52.

As will be understood, the pressure of the screened fluid in the shell 52 causes a portion thereof to flow through the nozzle 57 and the strainer device 52 to discharge, thus backwashing from the device 52 accumulations of solid matter thereon while continuing the screening operation.

In this construction, in accordance with an embodiment of my invention, the flow of backwashing fluid is controlled as and for the purpose explained in connection with the construction shown in Fig. 4, the apparatus to this end being provided at the backwashing outlet of the casing 48 with a cylinder 59 opening at one end into the port 55 and at its side into the pipe 58. In the inner end of the cylinder 59 is a slide valve 60 controlling the flow of the backwash fluid, this valve being mounted on a rod 61 slidable in the opposite end of the cylinder 59 and provided therein with nuts 62 adjustable along this rod and between which and the closed end of the cylinder 59 a coil spring 63 is interposed tending to close the valve 60. Mounted on the cylinder 59 is a diaphragm casing 64 containing a flexible diaphragm 65 secured to the rod 63 and separating the space within the casing 64 into two compartments 66 and 67, the compartment 66 being in communication, by a pipe 68 with the outlet pipe 69 of the construction and the compartment 67 being in communication, by a pipe 70 with the inlet 49 of the casing 48.

Figure 4:
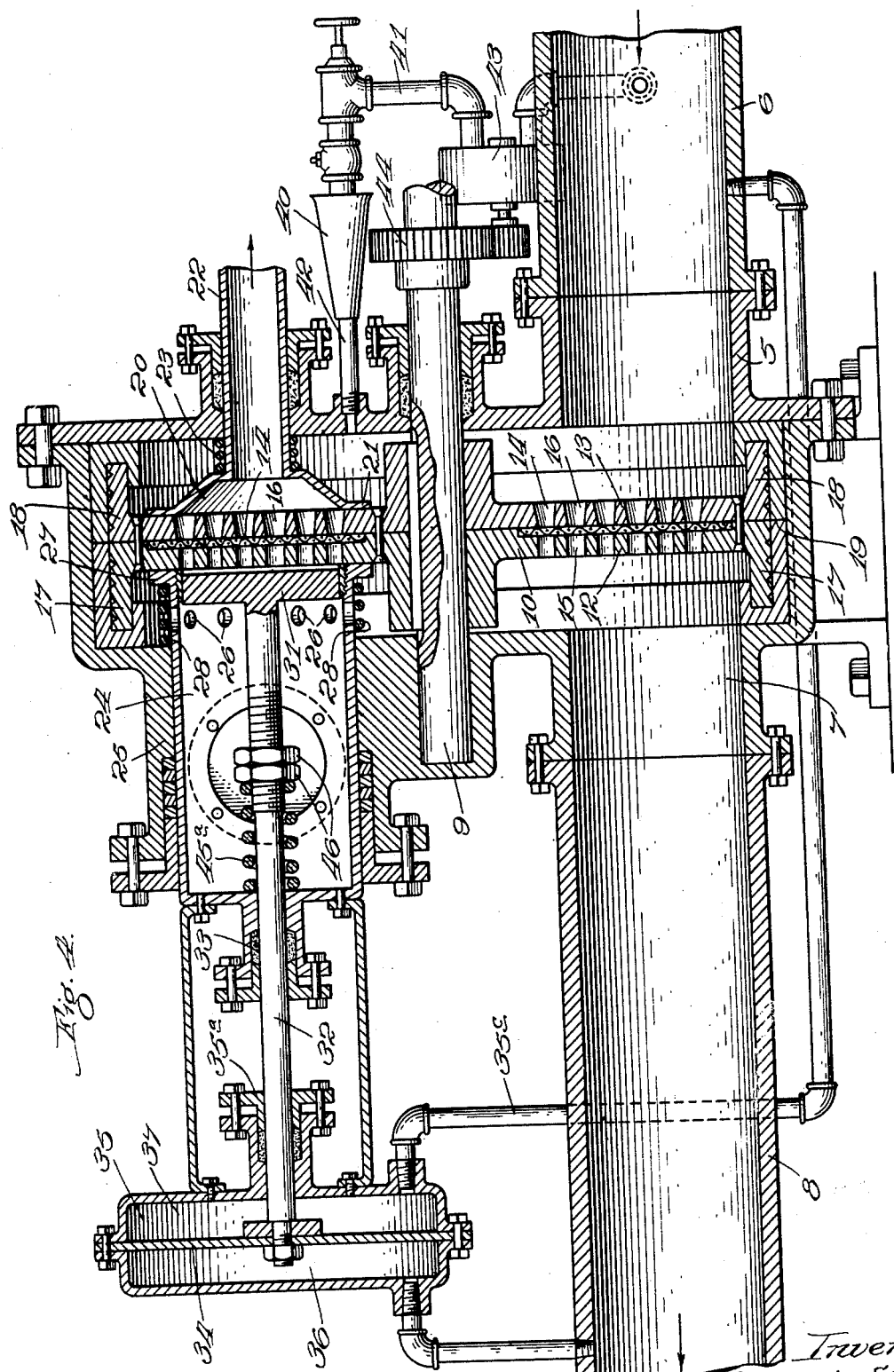
Figure 4 is a view like Fig. 1 of another embodiment of my invention.

There is thus provided differential mechanism for controlling the valve 60 operated by difference in pressures of the incoming fluid to be screened and of the screened fluid, as explained of the construction shown in Fig. 4, the degree of differential at which the valve 60 starts to open being controllable by adjusting the nuts 62.

As will be understood, the invention also contemplates the location of the backwash-controlling valve at the inlet of the backwashing course in this type of construction instead of at the outlet side thereof where the construction of strainer apparatus is such, as is known in the art, as to lend itself to control by a valve so located.

While I have illustrated and described certain embodiments of my invention I do not wish to be understood as intending to limit the invention thereto as the same may be variously modified and altered and the invention embodied in other forms of construction including additional types of strainer apparatus, without departing from the spirit of the invention.

What I claim as new, and desire to secure by Letters Patent, is:

1. A strainer apparatus comprising a casing having an inlet for the fluid to be operated on and an outlet for the conditioned fluid, a rotary strainer element in said casing through which the fluid in passing from said inlet to said outlet passes and is screened thereby, hollow members located at opposite sides of said strainer element and through which cleansing fluid for said strainer element passes, and means yieldingly forcing said members into close contact with said strainer element.

2. A strainer apparatus comprising a casing having an inlet for the liquid to be operated on and an outlet for the conditioned liquid, a rotary strainer device in said casing and through which the liquid in passing from said inlet to said outlet passes and is screened thereby, means for introducing gaseous fluid under pressure into the space in said casing to which the liquid is supplied, and means at the upper portion of the casing and open to the gaseous fluid introduced into the casing whereby the gaseous fluid is caused to flow from said casing through said strainer device in a direction to remove accumulations from the strainer device.

3. A strainer apparatus comprising a casing having an inlet for the fluid to be operated on and an outlet for the conditioned fluid, a rotary strainer disk in said casing and through which the fluid in passing from said inlet to said outlet passes and is screened thereby, and means for subjecting said strainer disk to a flow of fluid for removing accumulations on said strainer disk comprising a relatively long and narrow port closely adjacent said disk with its long dimension extending substantially radially of said disk and a valve movable in, and controlling, said port.

4. A strainer apparatus for liquid comprising a casing having an inlet for the liquid to be operated on and an outlet for the conditioned liquid, a rotary strainer disk in said casing and through which the liquid in passing from said inlet to said outlet passes and is screened thereby, means at the upper portion of said casing for directing a localized stream of cleaning gaseous fluid through said disk, said disk being spaced from said casing at both faces thereof to afford chambers communicating with the inlet and outlet, respectively, coextensive with said disk except for the areas covered by said means.

5. A strainer apparatus comprising a casing having an inlet for the fluid to be operated on and an outlet for the conditioned fluid, a rotary strainer element in said casing through which the fluid in passing from said inlet to said outlet passes and is screened thereby, means for directing a localized flow of fluid through said element for cleaning it and resilient means between said first-named means and said casing for resiliently pressing said first-named means against said strainer element to produce a tight joint.

6. A strainer apparatus comprising a casing having an inlet for the fluid to be operated on and an outlet for the conditioned fluid, a rotary strainer element in said casing through which the fluid passing from the inlet to the outlet is screened, means whereby localized flow of fluid is directed through said element for cleaning it comprising a hollow member, an inlet port and an outlet port at opposite sides of said element, one of said ports being provided in said hollow member, and resilient means between the casing and said hollow member for resiliently pressing said hollow member against said strainer element to produce a tight joint.

7. A strainer apparatus comprising a casing having an inlet for the fluid to be operated on and an outlet for the conditioned fluid, a rotary strainer element in said casing through which the fluid passing from the inlet to the outlet is screened, structure whereby localized flow of fluid is directed through said element for cleaning it comprising a hollow member, an outlet means, said member and outlet means being on opposite sides of the strainer, and resilient means urging contact of said hollow member, said strainer and said outlet means to produce a joint.

8. A strainer apparatus comprising a strainer device through which the fluid to be operated on passes and is screened thereby, means for locally backwashing said device with a fluid while continuing the screening operation, said means and device being relatively movable, and differential mechanism controlled by differential between the pressure of the fluid to be operated on at the inlet and of the screened fluid at the outlet, respectively, for effecting the flow of the backwashing fluid through said device and means whereby said mechanism operates when such differential increases to proportionately increase the amount of backwashing fluid and when such differential decreases to proportionately decrease the amount of backwashing fluid.

9. A strainer apparatus comprising a strainer device through which the fluid to be operated on passes and is screened thereby, means for backwashing said device with a fluid while continuing the screening operation, said means and device being relatively movable, and means operating responsive to the accumulation of solid matter on said device for controlling the backwashing fluid, said last-named means including means for varying the flow of backwashing fluid in proportion to the resistance of the accumulated mass of solid matter on said device to the flow therethrough of the fluid to be screened.

10. A fluid strainer apparatus comprising, a movable screen, automatically acting mechanism for backwashing said screen and means for controlling the volume of flow of backwashing fluid, said mechanism including means to cause said flow to be in ratio with the differential of pressure of fluid between the inlet and outlet sides of said screen.

11. A strainer apparatus comprising a casing having an inlet for the fluid to be operated on and an outlet for the conditioned fluid, a rotary strainer disk in said casing and through which the fluid passing from said inlet to said outlet passes and is screened thereby, a ring portion on said casing passing entirely across the periphery of said disk and having inwardly opening channels at the edges of said ring portion, outwardly directed annular flanges carried by the periphery of said disk, their edges entering said channels to prevent leakage about the periphery of said disk.

12. A strainer apparatus comprising a casing having an inlet for the fluid to be operated on and an outlet for the conditioned fluid, a rotary strainer device in said casing and through which the fluid in passing from said inlet to said outlet passes and is screened thereby, and a hollow member located at one side of said strainer device and containing an opening in communication with the interior of said casing at its outlet side and an opening communicating with said strainer device, the apparatus containing an outlet passage at the side of said strainer device opposite that at which said hollow member is located and in registration with said hollow member, said last named outlet passage being in communication with a space under less pressure than that in the outlet side of said casing.

BENJAMIN S. BURRELL.